(12) United States Patent
Yuasa et al.

(10) Patent No.: US 8,199,429 B2
(45) Date of Patent: Jun. 12, 2012

(54) MAGNETIC RECORDING HEAD AND MAGNETIC RECORDING METHOD

(75) Inventors: Hiromi Yuasa, Kawasaki (JP); Tomoko Taguchi, Kunitachi (JP); Hideaki Fukuzawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 937 days.

(21) Appl. No.: 12/076,440

(22) Filed: Mar. 18, 2008

(65) Prior Publication Data

US 2008/0239542 A1 Oct. 2, 2008

(30) Foreign Application Priority Data

Mar. 30, 2007 (JP) ................. P2007-094475
May 29, 2007 (JP) ................. P2007-141827

(51) Int. Cl.
*G11B 5/31* (2006.01)
*G11B 5/465* (2006.01)
(52) U.S. Cl. .................. 360/125.31; 360/125.03
(58) Field of Classification Search .......... 360/59, 360/75, 125.02, 125.3, 125.31, 125.03
See application file for complete search history.

(56) References Cited

U.S. PATENT DOCUMENTS

| | | | |
|---|---|---|---|
| 5,991,113 A | 11/1999 | Meyer et al. |
| 6,493,183 B1 | 12/2002 | Kasiraj et al. |
| 6,842,308 B1 | 1/2005 | Pust et al. |
| 6,907,322 B2 | 6/2005 | Ghoshal |
| 6,947,235 B2 | 9/2005 | Albrecht et al. |
| 7,068,468 B2 | 6/2006 | Kamijima |
| 7,271,981 B2 | 9/2007 | Ju et al. |
| 2002/0114108 A1 | 8/2002 | Bement et al. |
| 2002/0191326 A1 | 12/2002 | Xu et al. |
| 2003/0128633 A1 | 7/2003 | Batra et al. |
| 2004/0201920 A1 | 10/2004 | Koide et al. |
| 2005/0018348 A1 | 1/2005 | Lille et al. |
| 2005/0117242 A1 | 6/2005 | Taguchi |

FOREIGN PATENT DOCUMENTS

| | | |
|---|---|---|
| JP | 54-103009 | 8/1979 |
| JP | 01-282715 | 11/1989 |
| JP | 04-305809 | 10/1992 |
| JP | 05-081604 | 4/1993 |
| JP | 2001-291212 | 10/2001 |
| JP | 2002-074606 | 3/2002 |
| JP | 2006-190397 | 7/2006 |
| JP | 2007265562 A * | 10/2007 |
| JP | 2009054231 A * | 3/2009 |
| WO | 02/37480 A1 | 5/2002 |
| WO | 03/060883 | 7/2003 |

OTHER PUBLICATIONS

English-machine translation of JP 2006-190397 A to Ihara et al., published on Jul. 20, 2006.*
Taguchi et al., U.S. Appl. No. 10/995,555, filed Nov. 24, 2004.

* cited by examiner

*Primary Examiner* — Will J Klimowicz
(74) *Attorney, Agent, or Firm* — Nixon & Vanderhye, P.C.

(57) ABSTRACT

A magnetic recording head includes: a main magnetic pole containing a ferromagnetic layer; a main magnetic pole-magnetization fixing portion containing an antiferromagnetic layer in contact with at least one side surface of the main magnetic pole; a heater for heating at least the main magnetic pole so that a magnetic interaction between the main magnetic pole and the main magnetic pole-magnetization fixing portion can be decreased; and a magnetic field generator for generating a magnetic field so as to direct a magnetization of the main magnetic pole in one direction.

7 Claims, 17 Drawing Sheets

US 8,199,429 B2

MAGNETIC RECORDING HEAD AND MAGNETIC RECORDING METHOD

CROSS-REFERENCE TO RELATED APPLICATIONS

This application is based upon and claims the benefit of priority from the prior Japanese Patent Applications No. 2007-094475, filed on Mar. 30, 2007 and 2007-141827, filed on May 29, 2007; the entire contents of which are incorporated herein by reference.

BACKGROUND OF THE INVENTION

1. Field of the Invention

The present invention relates to a newly structured magnetic recording head and a magnetic recording method utilizing the magnetic recording head.

2. Description of the Related Art

Recently, a longitudinal magnetic recording method has been employed as a magnetic recording method. In the longitudinal magnetic recording method, the magnetizations relating to signals to be recorded are directed in parallel in the plane of a recording medium. However, the instability in the signals becomes remarkable due to heat fluctuation as the recording density becomes high so that the longitudinal magnetic recording method is substituted with a perpendicular magnetic recording method because the longitudinal magnetic recording method can maintain the signals stably. With the perpendicular magnetic recording method, since the magnetizations relating to the signals are directed perpendicular to the plane of the recording medium, a perpendicular recording magnetic head is required so as to realize the perpendicular magnetic recording method.

FIG. 1 is a structural view schematically showing a magnetic recording method using a conventional perpendicular magnetic recording head. In FIG. 1, a perpendicular magnetic recording head (hereinafter, often abbreviated as a "recording head") 10 includes a main magnetic pole 11 and a pair of submagnetic poles 12 which are arranged by a predetermined gap width. The rear end of the main magnetic pole 11 is magnetically connected with one of the sub magnetic poles 12. A coil 13 is wound around the main magnetic pole 11 so as to generate a writing magnetic field. A magnetic recording medium 20 is configured such that a recording layer 21 and a soft magnetic underlayer 22 are arranged via a non-magnetic intermediate layer 23.

The spacer layer magnetically divide the pinned layer and the free layer so that the magnetization of the free layer can be rotated independently from the magnetization of the pinned layer.

In writing, a writing current is flowed in the coil 13 to generate the current magnetic field at the main magnetic pole 11. As a result, the magnetizations of the main pole 11 are aligned along the direction of the writing current to generate the leaked magnetic field as a writing magnetic field. The writing magnetic field is applied to the magnetic recording medium 20 so as to penetrate through the magnetic recording medium 20. In this case, the bit information of the recording layer 21 is rewritten so that the writing magnetic field is circulated toward the sub magnetic poles 12 via the soft magnetic underlayer 22.

FIGS. 2 and 3 are explanatory views for the writing process of the recording head shown in FIG. 1. As shown in FIG. 2, when the current magnetic field is applied to the main magnetic pole 11 from the coil 13, the magnetization Ms of the main magnetic pole 11 is directed downward so that the writing process for the recording layer 21 of the magnetic recording medium 20 can be carried out by the leaked magnetic field from the magnetization Ms. On the other hand, as shown in FIG. 3, the current magnetic field is not applied to the main magnetic pole 11 from the coil 13 under the non-writing process, but the remnant magnetization MR occurs in the main magnetic pole 11 so as to realize the rewriting process of the bit information in the area of recording layer 21 located under the main magnetic pole 11. Such a rewriting process is called as a "Pole erasure".

In order to prevent the Pole erasure, such an attempt as devising the shape of the main magnetic pole 11 is made, but the writing efficiency can not be enhanced sufficiently and the Pole erasure can not be suppressed sufficiently because the writing efficiency is traded off with the Pole erasure. At present, the writing efficiency and the Pole erasure are appropriately controlled in view of the trade-off relation as occasion demands.

Recently, in view of the above problem, a new type magnetic recording head is proposed. In the magnetic recording head, main magnetic pole-magnetization fixing portions 24 made of antiferromagnetic material are disposed at both sides of the main magnetic pole 11 respectively so as to generate the magnetization toward the track width direction of the magnetic recording medium in the main magnetic pole 11 through the exchange coupling between the main magnetic pole 11 and the fixing portions 24 and then, conduct the writing process using the leaked magnetic field from the magnetization (Reference 1). FIGS. 4 and 5 show the magnetic recording head as described above. FIG. 4 shows the state of the magnetic recording head under the standby state, that is, not-writing condition. In this case, the magnetization of the main magnetic pole 11 becomes parallel to the surface of the recording layer 21 through the exchange coupling between the main magnetic pole 11 and the fixing portions 24. FIG. 5 shows the state of the magnetic recording head under the writing condition. In this case, the magnetization of the main magnetic pole 11 becomes perpendicular to the recording layer 21 along the current magnetic field Bs by the current flowed in the coil 13. In this case, the Pole erasure can be suppressed, but the writing efficiency is reduced because the magnetization of the main magnetic pole is unlikely to be directed perpendicular to the surface of the recording layer.
[Reference 1] JP-A 2006-190397 (KOKAI)

BRIEF SUMMARY OF THE INVENTION

An aspect of the present invention relates to a magnetic recording head including: a main magnetic pole containing a ferromagnetic layer; a main magnetic pole-magnetization fixing portion containing an antiferromagnetic layer in contact with at least one side surface of the main magnetic pole; a heater for heating at least the main magnetic pole so that a magnetic interaction between the main magnetic pole and the main magnetic pole-magnetization fixing portion can be decreased; and a magnetic field generator for generating a magnetic field so as to direct a magnetization of the main magnetic pole in one direction.

Another aspect of the present invention relates to a magnetic recording method using a magnetic recording head including; a main magnetic pole containing a ferromagnetic layer; a main magnetic pole-magnetization fixing portion containing an antiferromagnetic layer in contact with at least one side surface of the main magnetic pole; a heater for the main magnetic pole; and a magnetic field generator for generating a magnetic field so as to direct a magnetization of the main magnetic pole in one direction, including: heating, in writing, the main magnetic pole with the heater so that a magnetic interaction between the main magnetic pole and the main magnetic pole-magnetization fixing portion can be decreased; and generating, in the writing, the magnetic field with the magnetic generator so that the magnetization of the main magnetic pole can be directed perpendicular to a surface of a recording medium by the magnetic field.

DETAILED DESCRIPTION OF THE INVENTION

Hereinafter, the present invention will be described in detail with reference to the drawings.

In a magnetic recording head including a main magnetic pole containing a ferromagnetic layer and a main magnetic pole-magnetization fixing portion as shown in Reference 1, if a heater is provided for the main magnetic pole so as to heat the main magnetic pole, the magnetic interaction between the main magnetic pole and the main magnetic pole-magnetization fixing portion can be reduced. In writing, therefore, if at least the main magnetic pole is heated, the magnetization of the main magnetic pole can be directed perpendicular to the surface of the recording medium by the current magnetic field to be applied to the main magnetic field so that the writing efficiency can be enhanced.

In non-writing, the magnetization of the main magnetic pole can be directed parallel to the surface of the recording medium through the magnetic interaction between the main magnetic pole and the main magnetic pole-magnetization fixing portion. In writing, therefore, the rewriting for the recording medium by the magnetization of the main magnetic pole can be prevented so that the Pole erasure can be mitigated.

The main magnetic pole may be heated continuously or intermittently. Moreover, the heating process for the main magnetic pole can be stopped when the magnetization of the main magnetic pole is directed perpendicular to the surface of the recording medium.

In an embodiment, the heater includes a metallic body attached to the main magnetic pole. In this case, the main magnetic pole can be heated by the Joule heat generated by flowing a current in the metallic body. Therefore, the main magnetic pole can be heated by the simplified heater in structure.

In another embodiment, the heater includes an oxide layer with a metal path therein embedded in or provided in the vicinity of the main magnetic pole-magnetization fixing portion and a pair of electrodes, provided in the vicinity of the oxide layer, for flowing a current parallel to a surface of a recording medium through the metal path. In this case, only the temperature in the area in the vicinity of the metal path can be increased. Moreover, the wide range temperature control of several ten degrees Celsius to several hundred degrees Celsius can be conducted only by controlling the amount of current flowing in the metal path. In addition, since only the temperature in the area in the vicinity of the metal path is increased, the area is cooled down to room temperature immediately by stopping the flow of current in the metal path. Therefore, the heating and cooling operation for the main magnetic pole can be easily and immediately conducted.

According to the aspects of the present invention can be provided a new magnetic recording head which can mitigate the Pole erasure under the condition of the non-reduction of the writing efficiency and a magnetic recording method using the magnetic recording head.

First Embodiment

Figure 1:
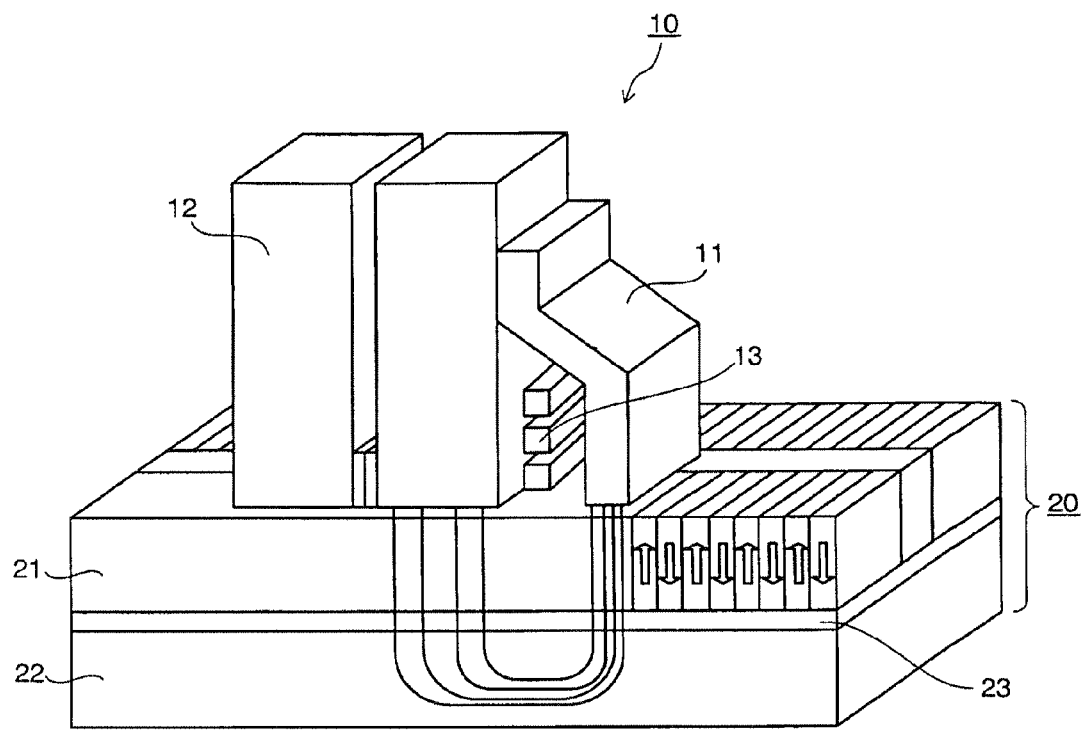
FIG. 1 is a structural view schematically showing a conventional perpendicular magnetic recording head.
Figure 2:
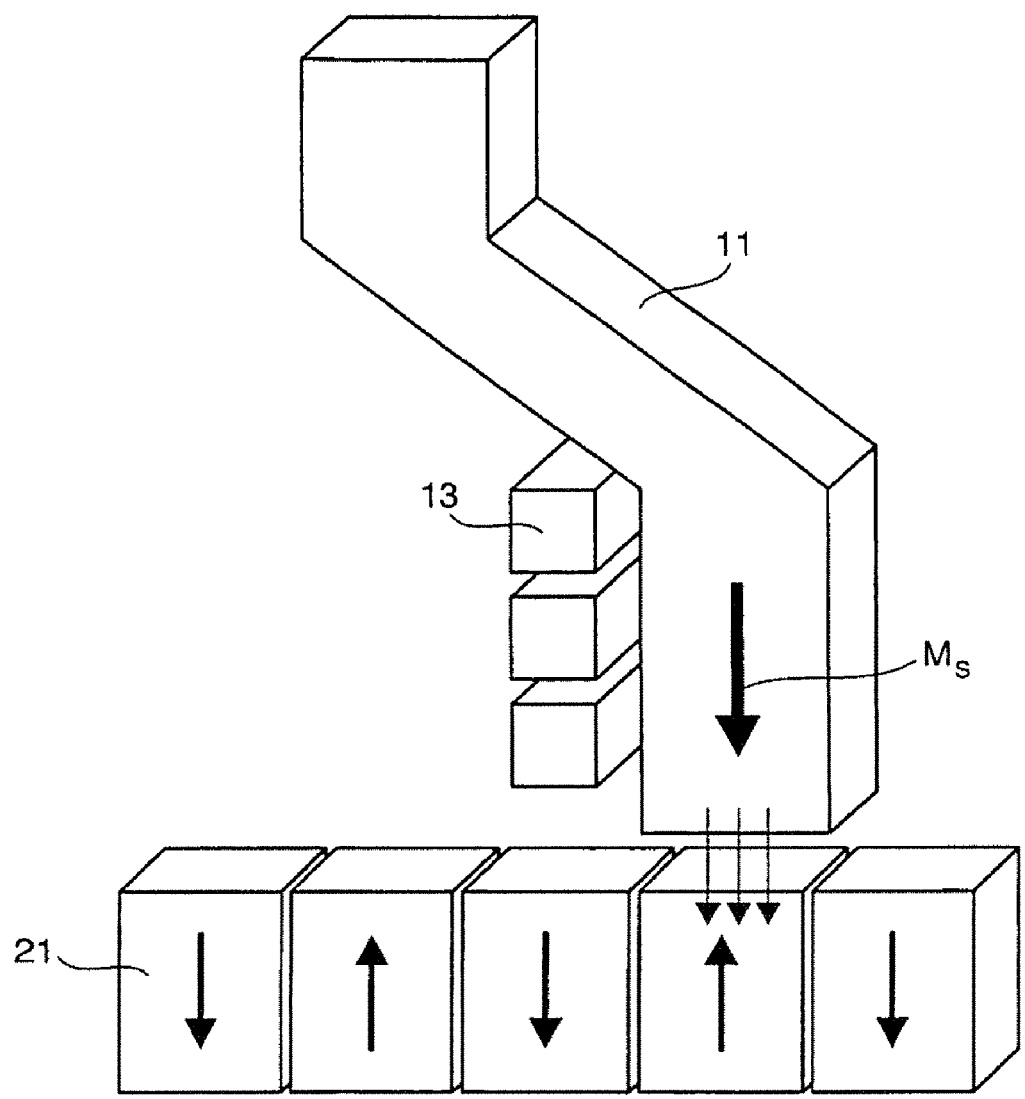
FIG. 2 is an explanatory view for the writing process using the magnetic recording head as shown in FIG. 1.
Figure 3:
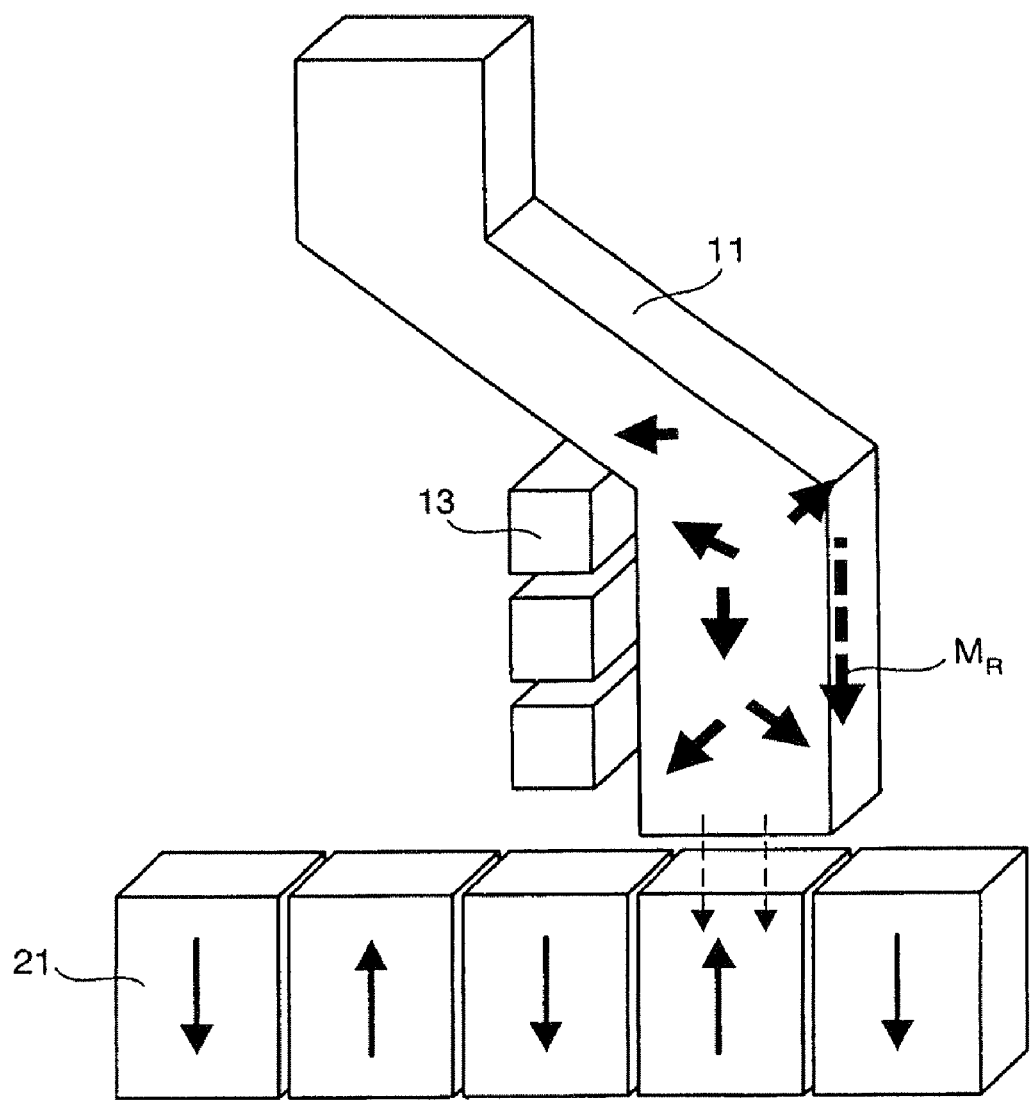
FIG. 3 is also an explanatory view for the writing process using the magnetic recording head as shown in FIG. 1.
Figure 4:
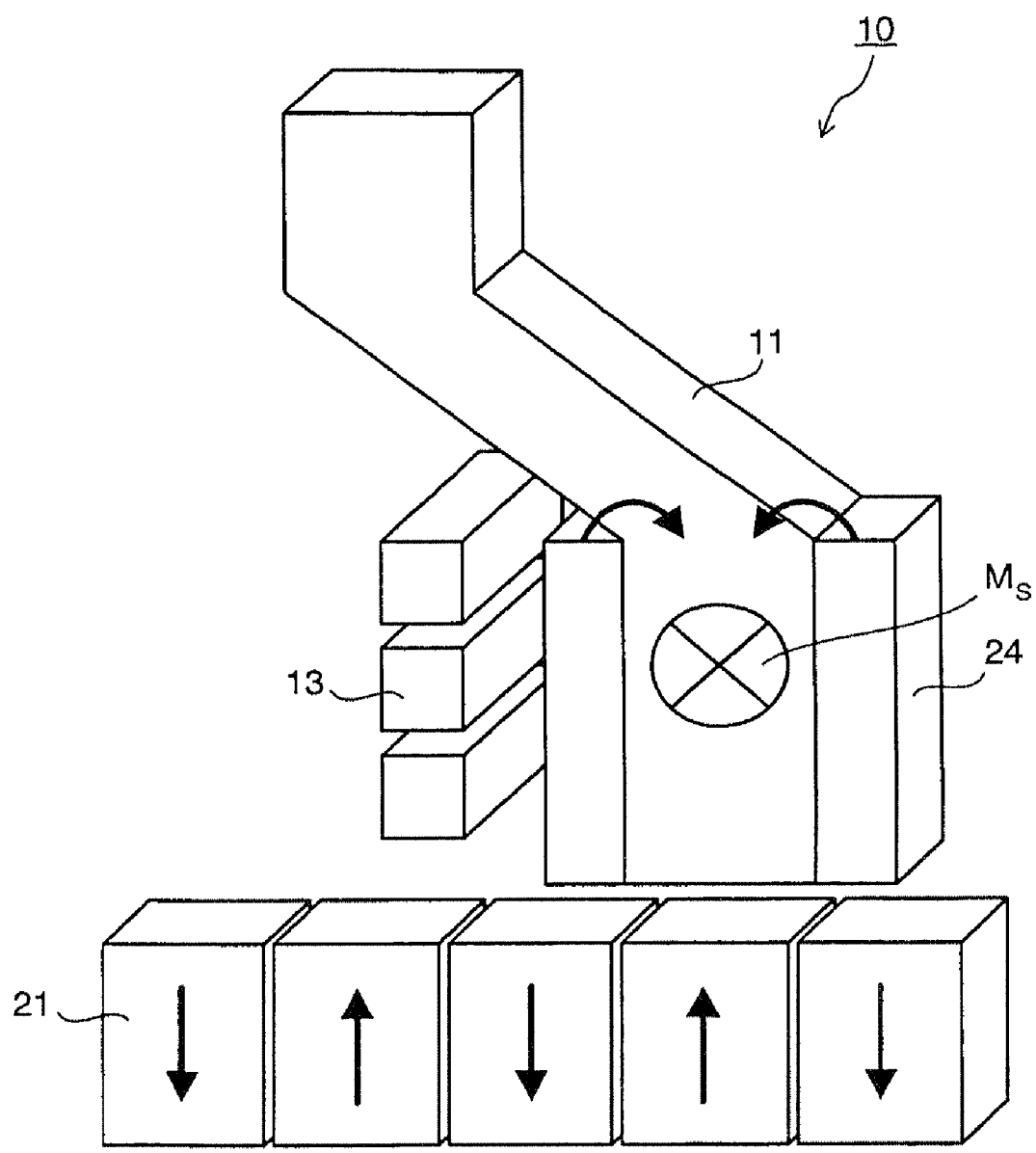
FIG. 4 is an explanatory view for the writing process using a magnetic recording head with an antiferromagnetic layer.
Figure 5:
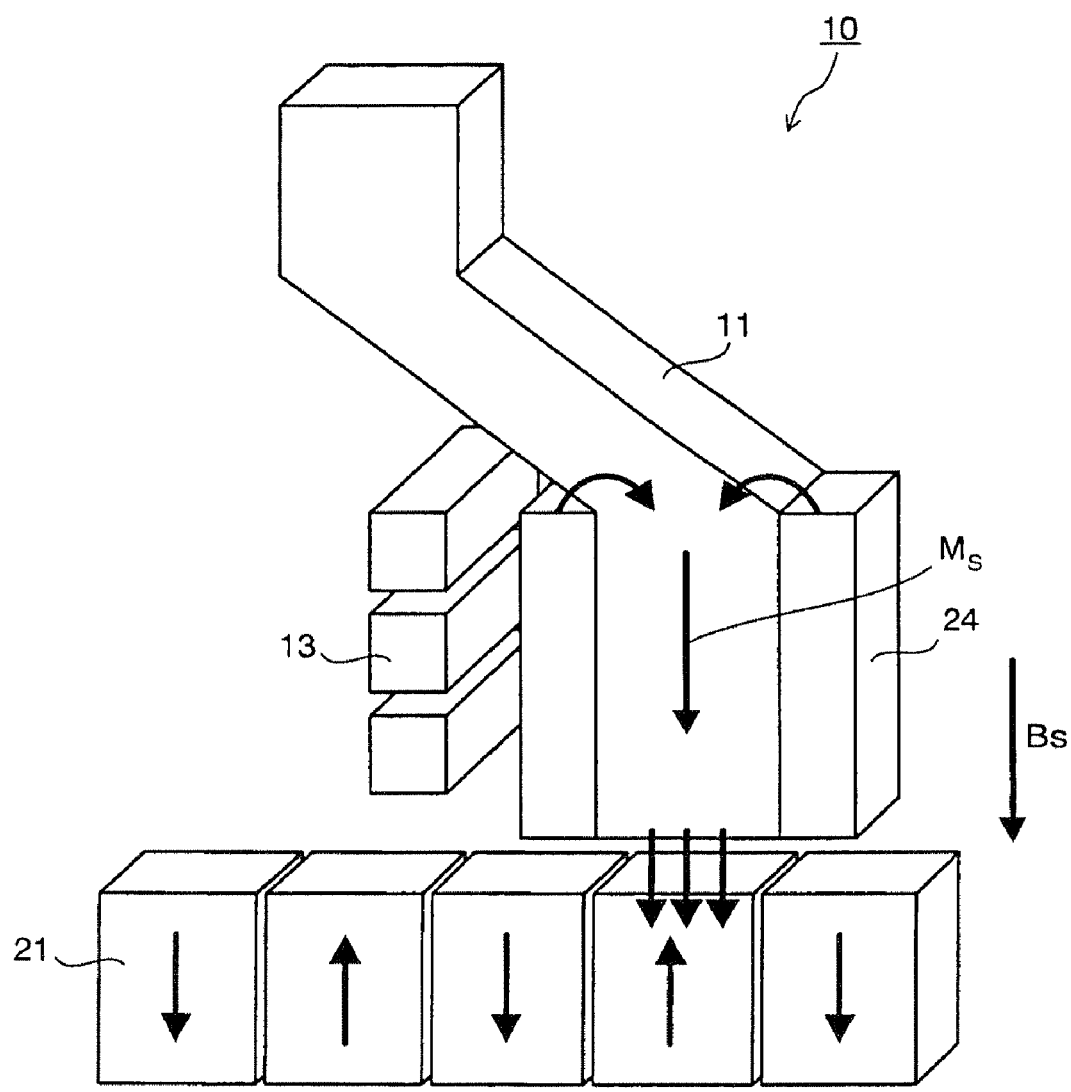
FIG. 5 is also an explanatory view for the writing process using a magnetic recording head with an antiferromagnetic layer.
Figure 6:
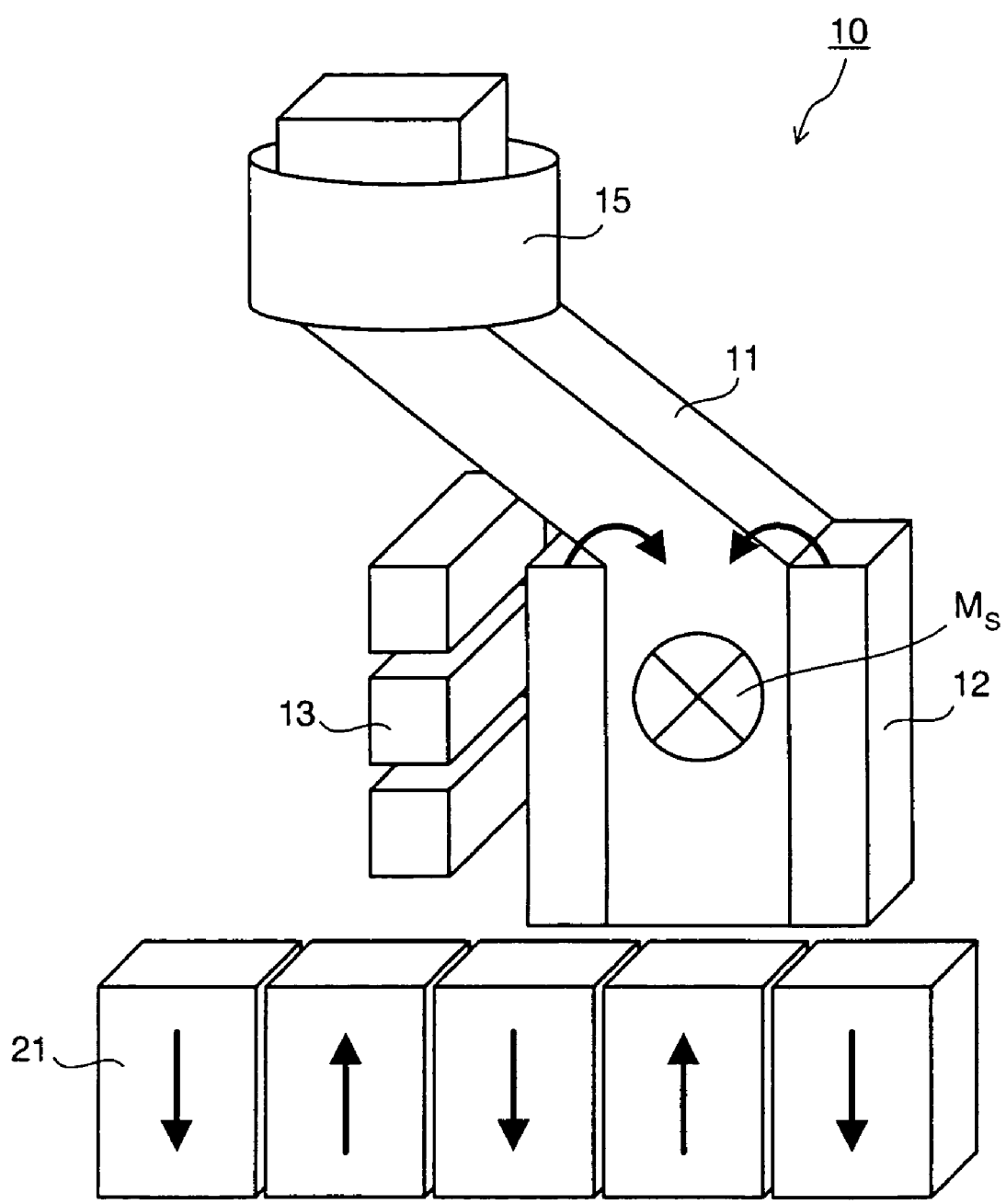
FIG. 6 is a structural view showing a magnetic recording head according to a first embodiment.
Figure 7:
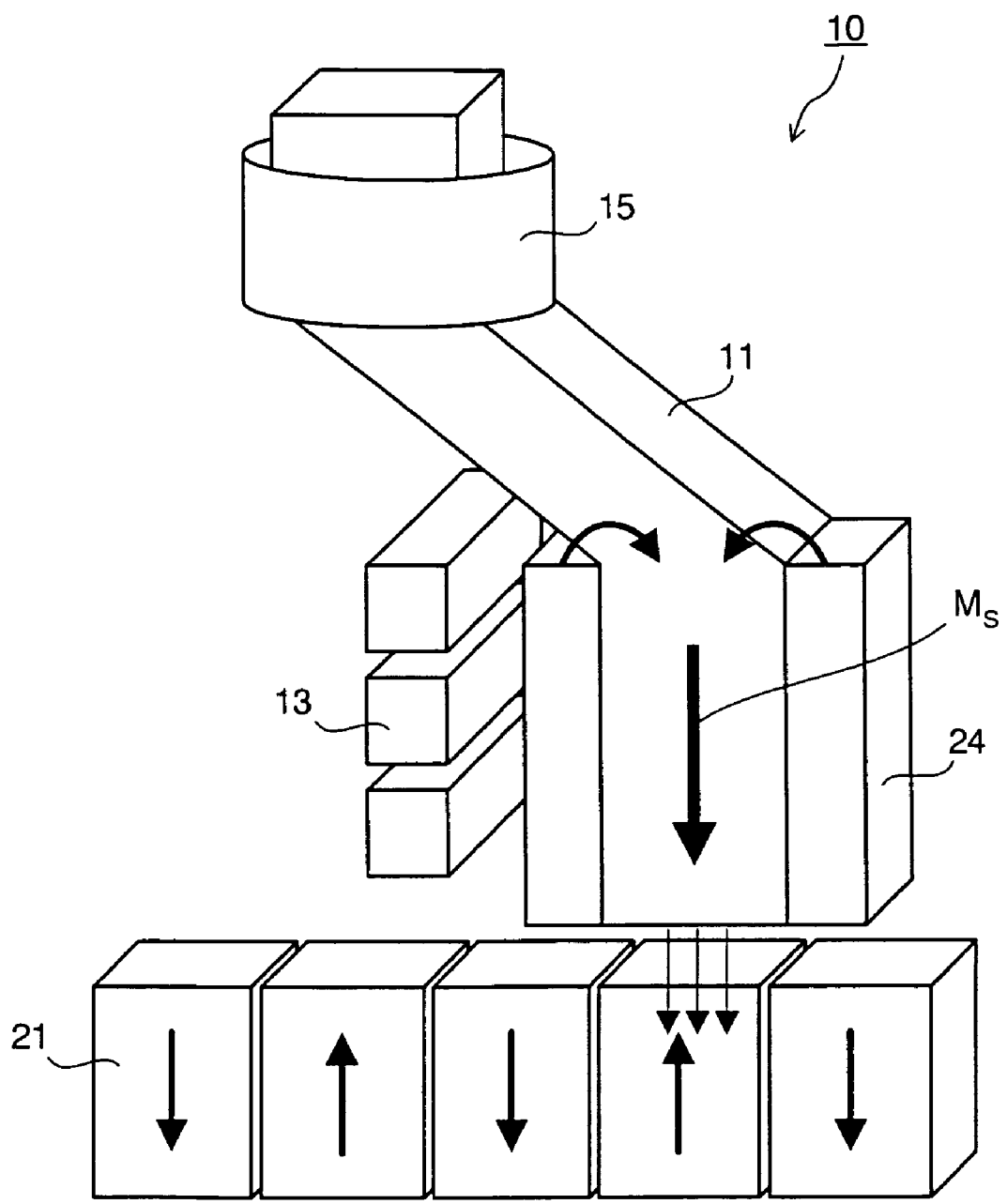
FIG. 7 is also a structural view showing the magnetic recording head according to the first embodiment.

FIGS. 6 and 7 relate to a structural view showing a magnetic recording head according to a first embodiment. FIG. 6 shows the non-writing state of the magnetic recording head and FIG. 7 shows the writing state of the magnetic recording head. Like or corresponding components are designated by the same reference numerals throughout the drawings.

In FIGS. 6 and 7, the magnetic recording head 10 includes the main magnetic pole 11 and the main magnetic pole-magnetization fixing portions 24 in contact with both sides of the main magnetic pole 11. The main magnetic pole 11 is constituted from a ferromagnetic layer made of FeCo-based alloy which can exhibit a larger recording magnetic field due to the larger saturated magnetization thereof. The intensity of the magnetization Ms of the alloy can be varied by controlling the composition of the alloy. The FeCo-based alloy may contain a third element such as Cr as occasion demands. When the FeCo-based alloy contains the third element, the magnetization Ms of the main magnetic pole 11 is decreased but the corrosion-resistance of the main magnetic pole 11 can be enhanced.

The main magnetic pole-magnetization fixing portions 24 are constituted from antiferromagnetic layers, respectively. As the antiferromagnetic layer, an IrMn layer, PtMn layer, FeMn layer, NiMn layer, Ni—O layer, Fe—O layer and Ni—Fe—O layer can be exemplified.

Then, the coil 13, made of, e.g., Cu, is wound around the main magnetic pole 11 to generate a writing magnetic field. Then, a metallic body such as a Cu foil is wound as a heating mechanism around the end portion of the main magnetic pole 11 at the opposite side of the recording layer.

Then, the recording method using the magnetic recording head 10 shown in FIGS. 6 and 7 will be described. As shown in FIG. 6, first of all, under the non-writing state when the current magnetic field (Hcurr) is not applied to the main magnetic pole 11 from the coil 13, the main magnetic pole 11 made of the ferromagnetic material is annealed under magnetic field so that the magnetization Ms of the main magnetic pole 11 is set (fixed) parallel to the surface of the recording layer 21 (magnetic recording medium), through the fixing magnetic field from the main magnetic pole-magnetization fixing portions 24. Instead of the annealing process, the magnetization Ms of the main magnetic pole 11 can be fixed by conducting the film formation under magnetic field.

The fixing magnetic field is called as a "magnetic field of unidirectional magnetic anisotropy (Hua). According to the magnetic field of unidirectional magnetic anisotropy (Hua), since the magnetization Ms of the main magnetic pole 11 becomes parallel to the surface of the recording layer 21 under the condition that the current magnetic field (Hcurr) is not applied, no perpendicular leaked magnetic field, which affects the recording condition of the recording layer 21, is generated. Therefore, the recording layer 21 is not rewritten by mistake under the non-writing state and thus, the Pole erasure can be prevented.

Under the writing state, a current is flowed in the Cu foil 15 to generate a Joule heat and then, heat the main magnetic pole 11 to a predetermined temperature by the Joule heat until the magnetic field of unidirectional magnetic anisotropy (Hua) is decreased remarkably. In this case, when the current magnetic field (Hcurr) is applied from the coil 13, the relation of the current magnetic field (Hcurr)>the magnetic field of unidirectional magnetic anisotropy (Hua) can be satisfied even though the intensity of the current magnetic field (Hcurr) is relatively small. Therefore, the magnetization Ms of the main magnetic pole 11 can be directed perpendicular to the surface of the recording layer 21 (magnetic recording medium) by the current magnetic field (Hcurr) against the magnetic field of unidirectional magnetic anisotropy (Hua) so that the leaked magnetic field can be generated perpendicular to the surface of the recording layer 21.

As a result, the writing operation for the recording layer 21 can be performed using the most of the leaked magnetic field so that the writing efficiency can be enhanced. In other words, according to this embodiment, a new type magnetic recording head which can mitigate the Pole erasure under the condition of the non-reduction of the writing efficiency can be provided and the new magnetic recording method using the magnetic recording head can be provided.

Figure 8:
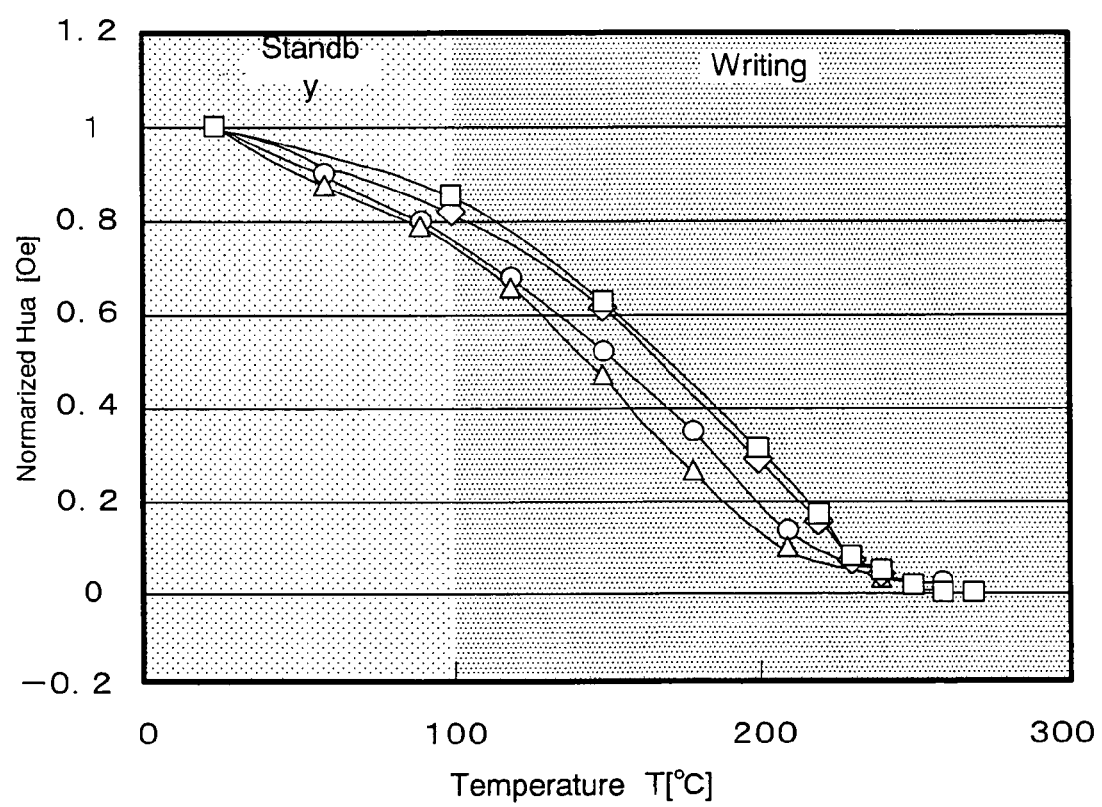
FIG. 8 is a graph showing the relation between the heating temperature of the main magnetic pole and the magnetic field of unidirectional magnetic anisotropy (Hua) in the magnetic recording head according to the first embodiment.

FIG. 8 is a graph showing the relation between the heating temperature of the main magnetic pole 11 and the magnetic field of unidirectional magnetic anisotropy (Hua) in this embodiment. The magnetic field of unidirectional magnetic anisotropy (Hua) is normalized arbitrarily. In FIG. 8, the main magnetic pole 11 is made of the FeCo-based alloy and the main magnetic pole-magnetization fixing portion 24 is made of IrMn. As is apparent from FIG. 8, the magnetic field of unidirectional magnetic anisotropy (Hua) is decreased with the increase of the heating temperature of the main magnetic pole 11 and diminished around 250° C. In this case, since the magnetic field of unidirectional magnetic anisotropy (Hua) becomes half at about 150° C., the writing operation can be performed at about 150° C. by using the current magnetic field (Hcurr) of a relatively small intensity.

Not shown, when the main magnetic pole-magnetization fixing portions 24 are made of PtMn as the antiferromagnetic material, the magnetic field of unidirectional magnetic anisotropy (Hua) is decreased with the increase of the heating temperature of the main magnetic pole 11 and diminished around 300° C.

The cross-section area of the forefront of the main magnetic pole 11, which is along the surface of the recording layer 21 (magnetic recording medium), is set small in order to develop the recording efficiency. Not shown, when the length of the side along the track width direction in the forefront of the main magnetic pole 11 is set to 0.1 μm and the length of the side along the track direction in the forefront of the main magnetic pole 11 is set to 0.25 μm and when the main magnetic pole 11 is made of FeCo and the main magnetic pole-magnetization fixing portions 24 are made of IrMn, the writing operation for the recording layer 21 can be performed by applying the current magnetic field (Hcurr) of 2.2(T) from the coil 13 under the condition that the boundary temperature between the pole 11 and the portions 24 is heated to 150° C. Herein, the recording layer 21 means a perpendicular two-layered structure of the recording layer with the magnetization easy axis perpendicular to the surface thereof and the underlayer of soft magnetic property formed under the recording layer, strictly.

Second Embodiment

Figure 9:
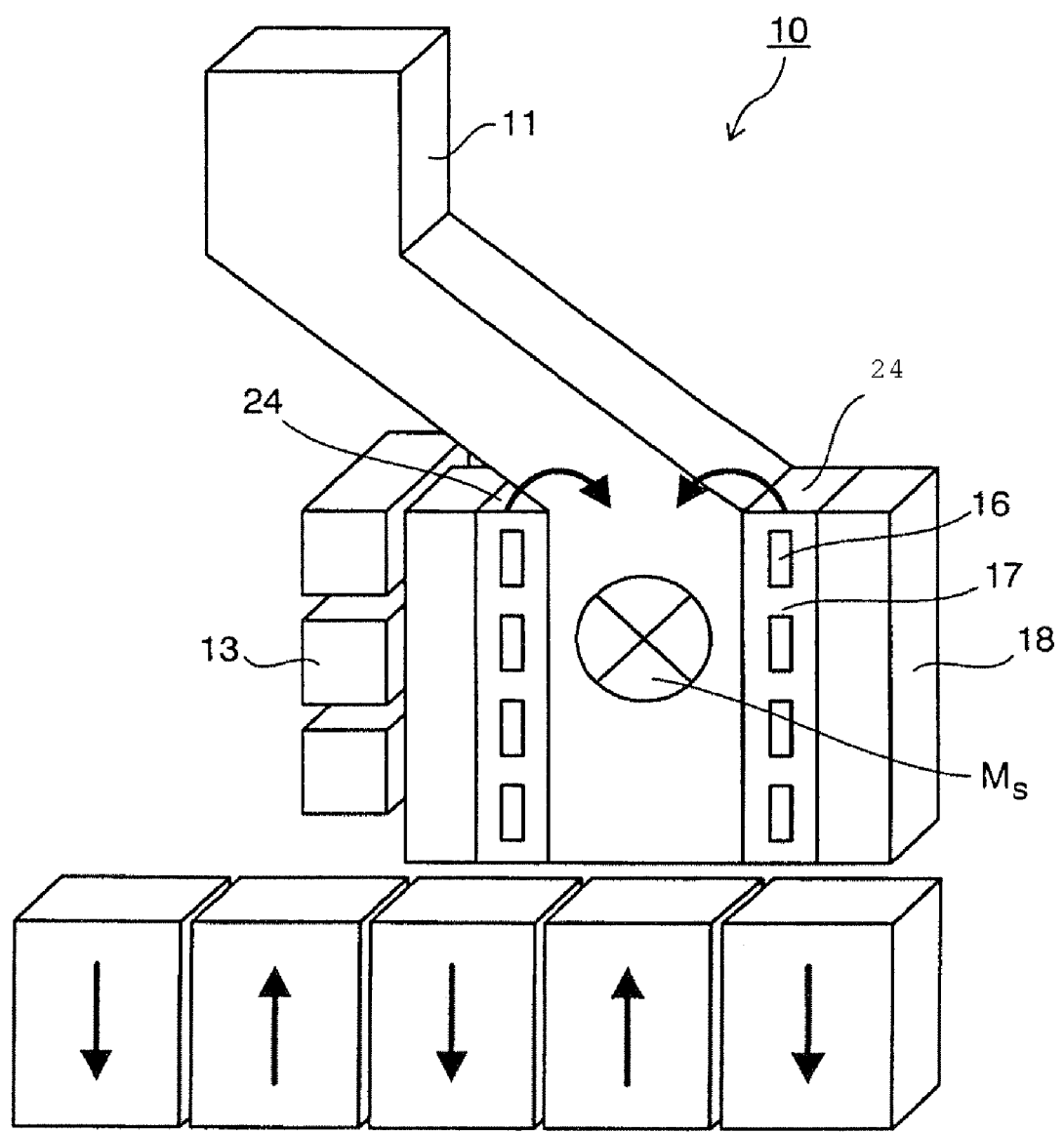
FIG. 9 is a structural view showing a magnetic recording head according to a second embodiment.
Figure 10:
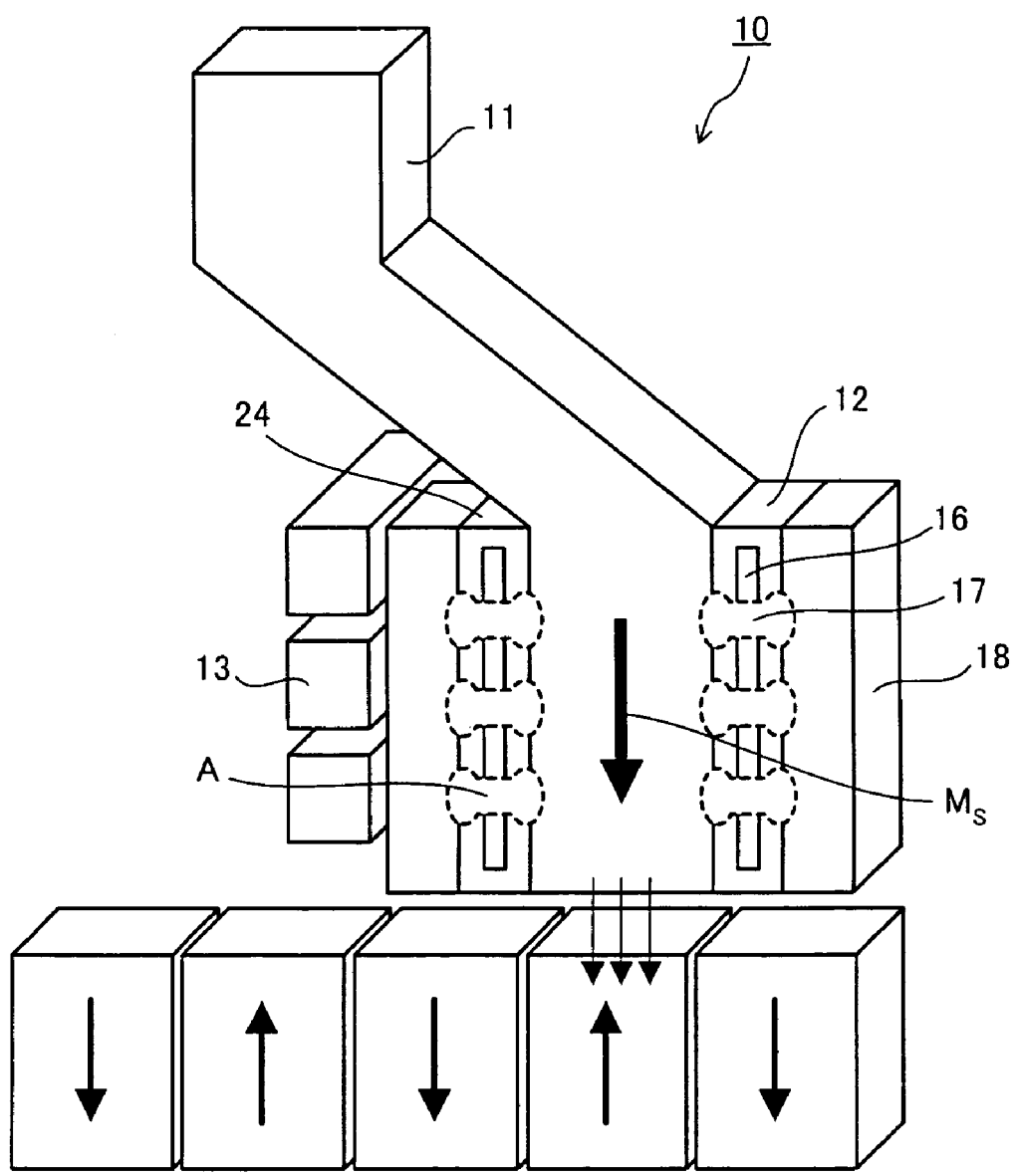
FIG. 10 is also a structural view showing the magnetic recording head according to the second embodiment.

FIGS. 9 and 10 relate to a structural view showing a magnetic recording head according to a second embodiment.

In FIGS. 9 and 10, the magnetic recording head 10 includes the main magnetic pole 11 and the main magnetic pole-magnetization fixing portions 24 in contact with both sides of the main magnetic pole 11. The main magnetic pole 11 is constituted from a ferromagnetic layer made of FeCo-based alloy which can exhibit a larger recording magnetic field due to the larger saturated magnetization thereof. The intensity of the magnetization Ms of the alloy can be varied by controlling the composition of the alloy. The FeCo-based alloy may contain a third element such as Cr as occasion demands. When the FeCo-based alloy contains the third element, the magnetization Ms of the main magnetic pole 11 is decreased but the corrosion-resistance of the main magnetic pole 11 can be enhanced.

The main magnetic pole-magnetization fixing portions 24 are constituted from antiferromagnetic layers, respectively. As the antiferromagnetic layer, an IrMn layer, PtMn layer, FeMn layer, NiMn layer, Ni—O layer, Fe—O layer and Ni—Fe—O layer can be exemplified.

In this embodiment, oxide layers 16 are embedded in the main magnetic pole-magnetization fixing portions 24 so as to form metal paths 17 between the adjacent oxide layers 16, respectively. Then, a pair of electrodes 18 are formed in contact with the outer side surfaces of the main magnetic pole-magnetization fixing portions 24.

The oxide layers 16 are made of Al oxide such as $Al_2O_3$, Ti oxide, Hf oxide, Mg oxide, Zr oxide, Cr oxide, Ta oxide, Nb oxide, Mo oxide, Si oxide, V oxide or the like. Then, a third additive may be contained in the oxide layer 16 as occasion demands. As the third additive, Ti, Hf, Mg, Zr, V, Mo, Si, Cr, Nb, Ta, W, B, C, V can be exemplified. The metal paths 17 can be made of the same antiferromagnetic material as the main magnetic pole-magnetization fixing portion 24 originated from the forming process thereof. The electrodes 18 may be made of a metallic material commercially available such as Cu, Au, Ag.

In this embodiment, first of all, the main magnetic pole 11 is made of the ferromagnetic material, and then, a first antiferromagnetic layer, an oxide layer, a second antiferromagnetic layer and an electrode are subsequently formed on each of the side surfaces of the main magnetic pole 11. The film forming process can be performed by means of a conventional method such as sputtering method or CVD method. Alternatively, the film forming process can be performed by conducting ion beam irradiation or plasma irradiation for the first antiferromagnetic layer and/or the oxide layer after the first antiferromagnetic layer or the oxide layer is formed. In this case, the elements of the first antiferromagnetic layer are pumped up into the oxide layer to form the metal paths 17 as described above. The first antiferromagnetic layer and the second antiferromagnetic layer constitute the main magnetic pole-magnetization fixing portion 24 as they are and the electrode directly constitutes the electrode 18 as it is.

Then, the recording method using the magnetic recording head 10 shown in FIGS. 9 and 10 will be described. As shown in FIG. 9, first of all, under the non-writing state when the current magnetic field (Hcurr) is not applied to the main magnetic pole 11 from the coil 13, the main magnetic pole 11 made of the ferromagnetic material is annealed under magnetic field so that the magnetization Ms of the main magnetic pole 11 is set (fixed) parallel to the surface of the recording layer 21 (magnetic recording medium), through the fixing magnetic field from the main magnetic pole-magnetization fixing portions 24. Instead of the annealing process, the magnetization Ms of the main magnetic pole 11 can be fixed by conducting the film formation under magnetic field.

In the non-writing state, according to the magnetic field of unidirectional magnetic anisotropy (Hua), since the magnetization Ms of the main magnetic pole 11 becomes parallel to the surface of the recording layer 21 under the condition that the current magnetic field (Hcurr) is not applied, no perpendicular leaked magnetic field, which affects the recording condition of the recording layer 21, is generated. Therefore, the recording layer 21 is not rewritten by mistake under the non-writing state and thus, the Pole erasure can be prevented.

Under the writing state, a given voltage is applied between the electrodes 18 so as to flow a current in the metal paths 17 to generate Joule heats around the areas "A" in the vicinity of the metal paths 17 and then, heat the boundaries between the antiferromagnetic layers constituting the main magnetic pole-magnetization fixing portions 24 and the main magnetic pole 11 to a predetermined temperature by the Joule heats until the magnetic field of unidirectional magnetic anisotropy (Hua) is decreased remarkably. The relation between the magnetic field of unidirectional magnetic anisotropy (Hua) and the heating temperature is similar to the relation in FIG. 8 relating to the first embodiment. In this case, when the current magnetic field (Hcurr) is applied from the coil 13, the relation of the current magnetic field (Hcurr)>the magnetic field of unidirectional magnetic anisotropy (Hua) can be satisfied even though the intensity of the current magnetic field (Hcurr) is relatively small. Therefore, the magnetization Ms of the main magnetic pole 11 can be directed perpendicular to the surface of the recording layer 21 (magnetic recording medium) by the current magnetic field (Hcurr) against the magnetic field of unidirectional magnetic anisotropy (Hua) so that the leaked magnetic field can be generated perpendicular to the surface of the recording layer 21.

As a result, the writing operation for the recording layer 21 can be performed using the most of the leaked magnetic field so that the writing efficiency can be enhanced. In other words, according to this embodiment, a new type magnetic recording head which can mitigate the Pole erasure under the condition of the non-reduction of the writing efficiency can be provided and the new magnetic recording method using the magnetic recording head can be provided.

In this embodiment, only the temperature in the areas "A" in the vicinity of the metal paths 17 can be increased. Moreover, the wide range temperature control of several ten degrees Celsius to several hundred degrees Celsius can be conducted only by controlling the amount of current flowing in the metal paths 17. The concrete increase in temperature of the area "A" in this embodiment was simulated and listed in Table 1.

TABLE 1

| Temperture increase of metal path by application of voltage | |
|---|---|
| 90 mV | +44° C. |
| 120 mV | +78° C. |
| 150 mV | +127° C. |

In this embodiment, since only the temperature in the areas "A" in the vicinity of the metal paths 17 is increased, the areas "A" are cooled down to room temperature immediately by stopping the flow of current in the metal paths 17. Therefore, the heating and cooling operation for the main magnetic pole 11 can be easily and immediately conducted.

Third Embodiment

Figure 11:
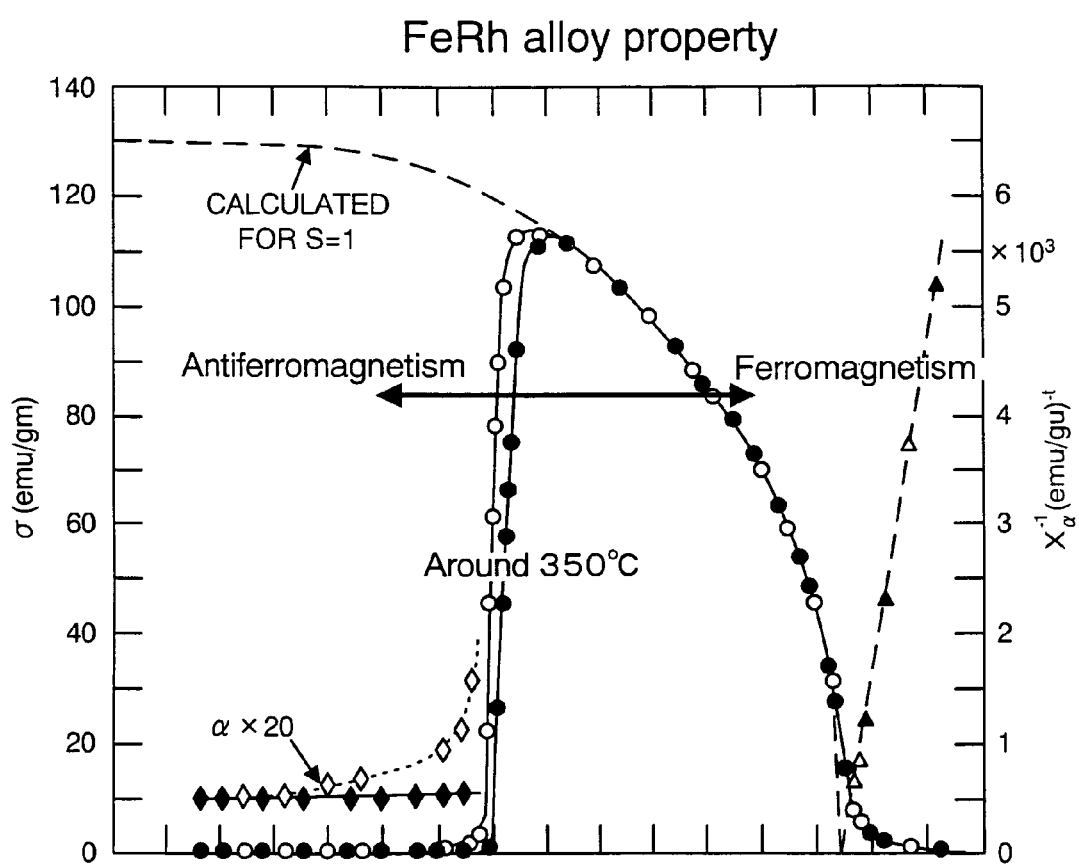
FIG. 11 is a graph showing the magnetization of FeRh alloy with temperature.

In this embodiment, the material of the antiferromagnetic layer constituting the main magnetic pole-magnetization fixing portion 24 of the magnetic recording head in the first embodiment and the second embodiment is changed. In this embodiment, namely, the antiferromagnetic layer is made of FeRh alloy. FIG. 11 is a graph showing the temperature dependence of the FeRh alloy. The FeRh alloy exhibits magnetic phase transition around room temperature, antiferromagnetic property below room temperature and ferromagnetic property over room temperature. The temperature of the magnetic phase transition can be varied within a temperature range of several ten degrees Celsius by controlling the composition of the FeRh alloy and the forming method of the FeRh alloy.

If the antiferromagnetic layer of the main magnetic pole-magnetization fixing portion 24 is made of the FeRh alloy, the following operation can be conducted: Namely, the antiferromagnetic layer functions as an antiferromagnetic layer for fixing the magnetization of the main magnetic pole as it is at the standby state and functions as a ferromagnetic layer at the writing state so as to increase the substantial magnetization of the magnetic recording head 10 in combination with the magnetization of the main magnetic pole 11. As a result, the writing efficiency can be enhanced under the condition of the reduction of the Pole erasure.

Although the present invention was described in detail with reference to the above examples, this invention is not limited to the above disclosure and every kind of variation and modification may be made without departing from the scope of the present invention.

For example, the configuration of the magnetic recording head in the first embodiment can be combined with the configuration of the magnetic recording head in the second embodiment. In this case, the temperature control for the main magnetic pole-magnetization fixing portions 24 can be conducted for a short period of time. Concretely, in the magnetic recording head as shown in FIGS. 9 and 10 relating to the second embodiment, if the fixing portions 24 are heated to a predetermined temperature in advance by the heater 15 disposed at the top end of the main magnetic pole 11, the fixing portions 24 can be heated easily and immediately to the temperature satisfying the relation of the current magnetic field (Hcurr)>the unidirectional magnetic anisotropy magnetic field (Hua).

Figure 12:
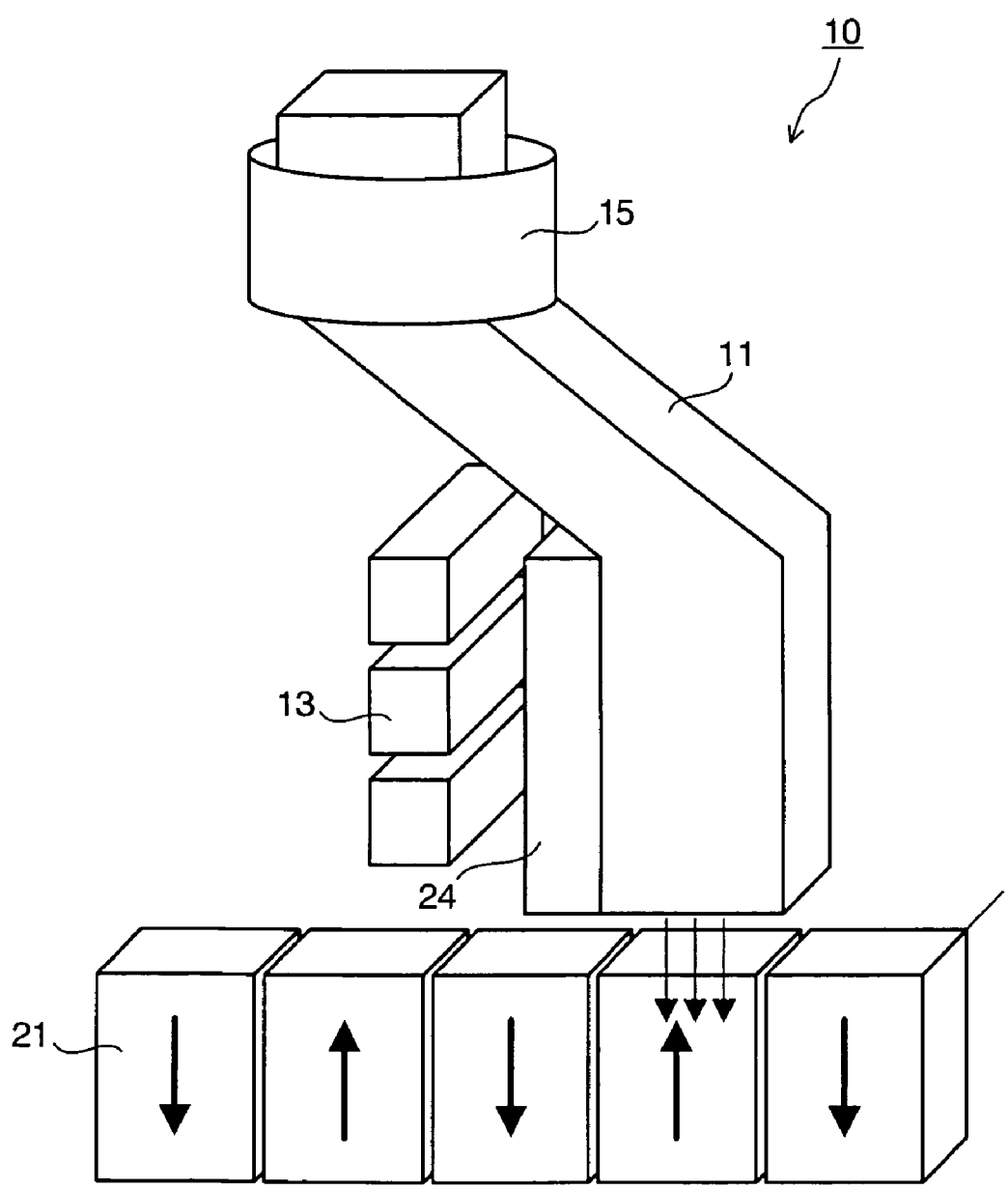
FIG. 12 is a structural view showing a magnetic recording head according to another embodiment.
Figure 13:
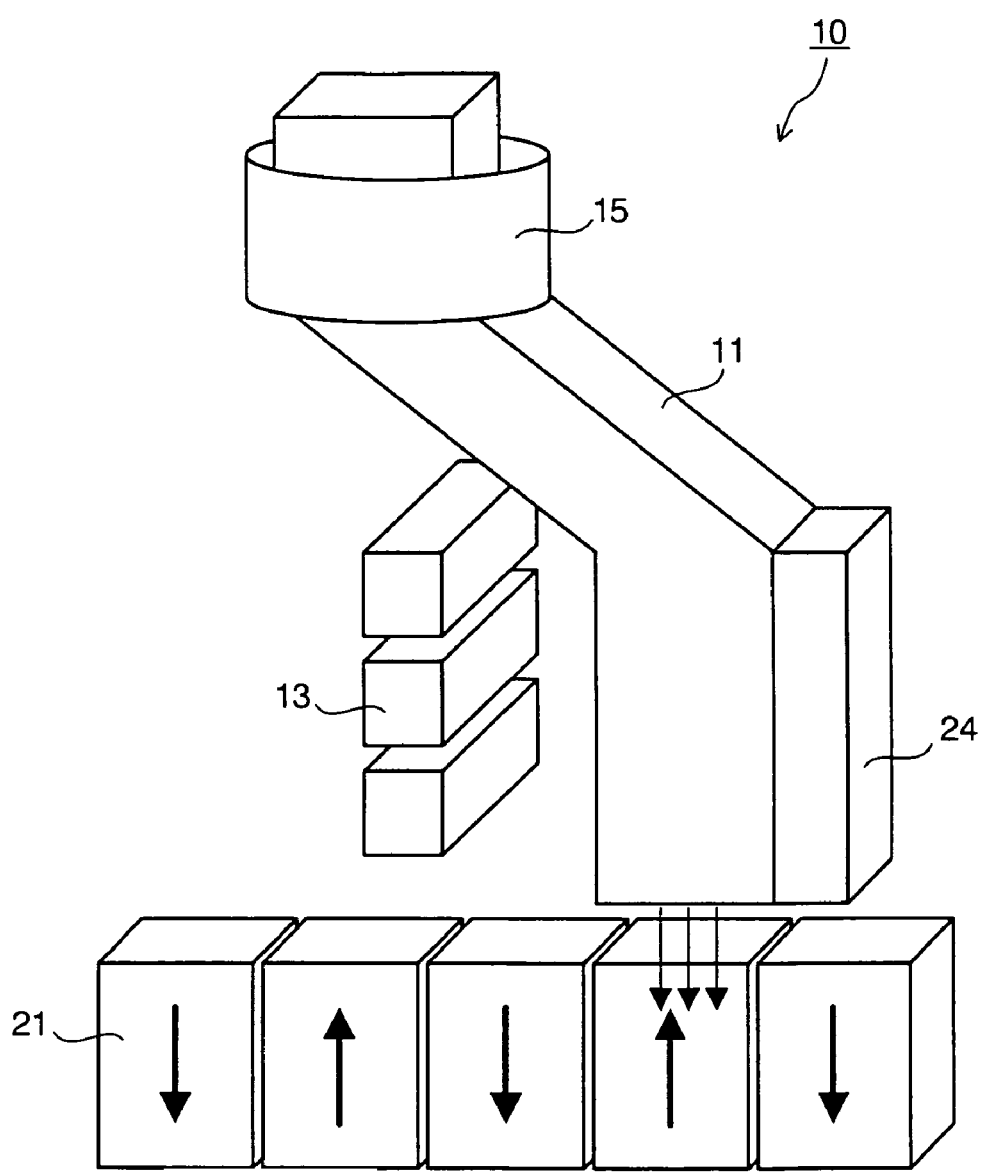
FIG. 13 is a structural view showing a magnetic recording head according to still another embodiment.
Figure 14:
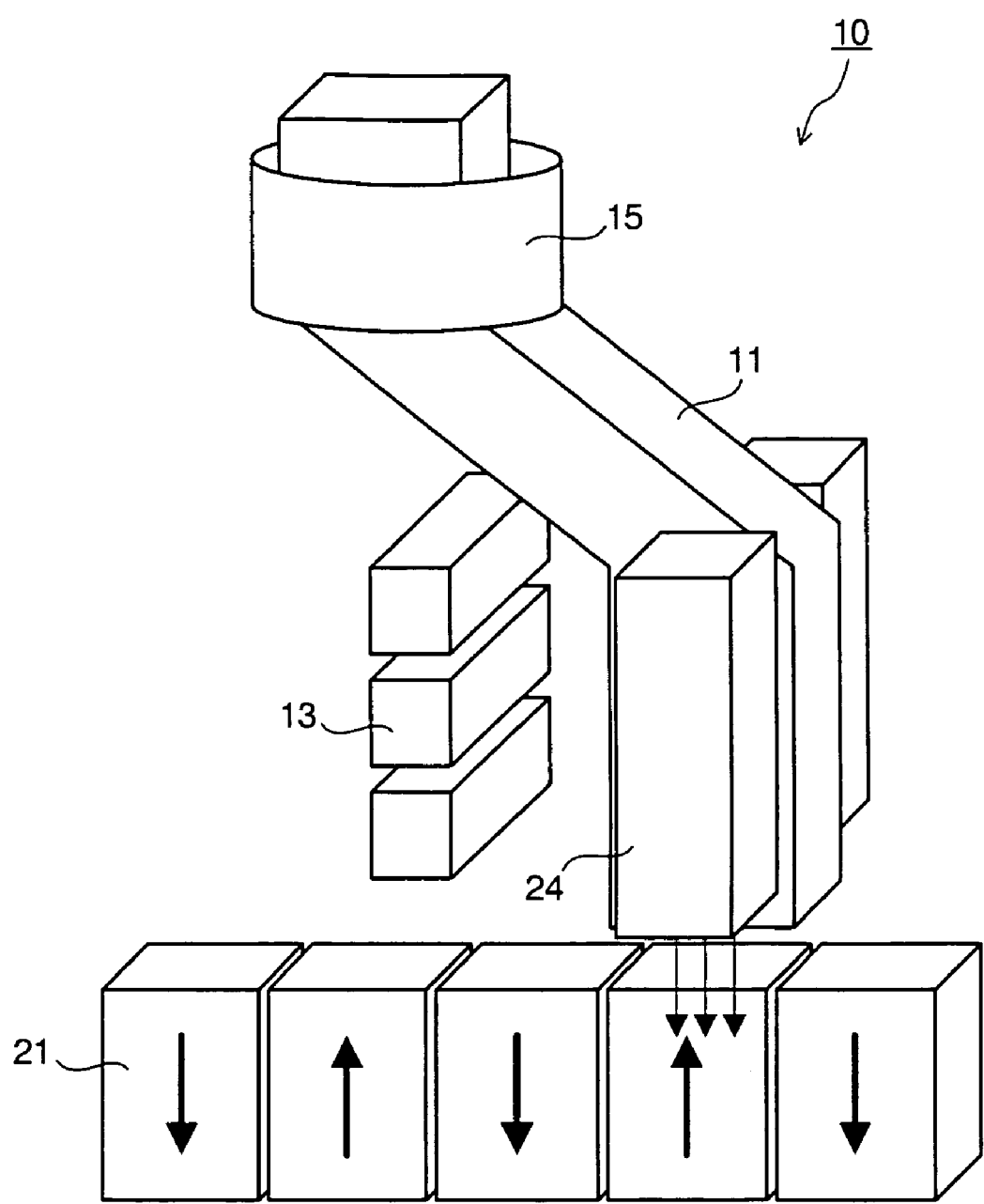
FIG. 14 is a structural view showing a magnetic recording head according to a further embodiment.
Figure 15:
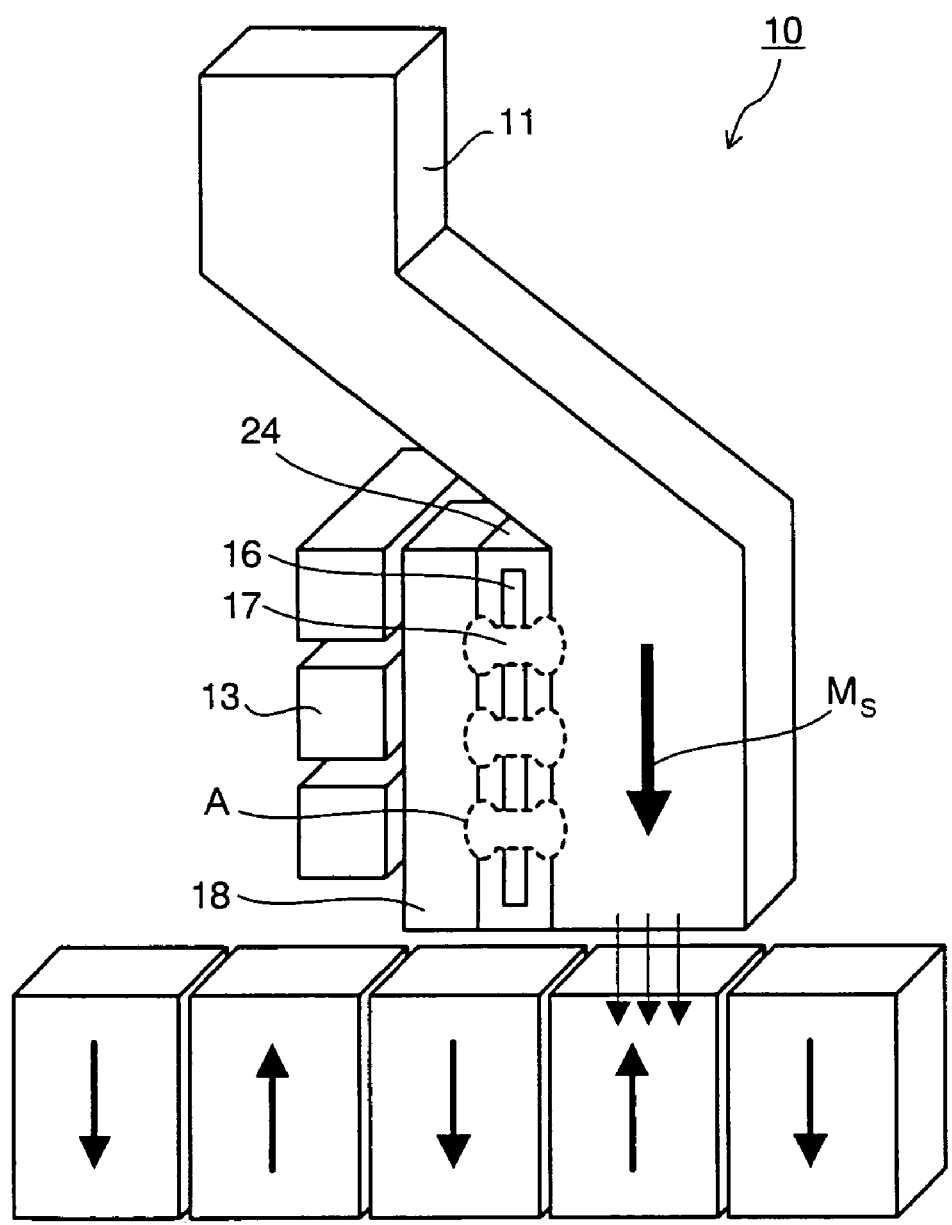
FIG. 15 is a structural view showing a magnetic recording head according to a still further embodiment.
Figure 16:
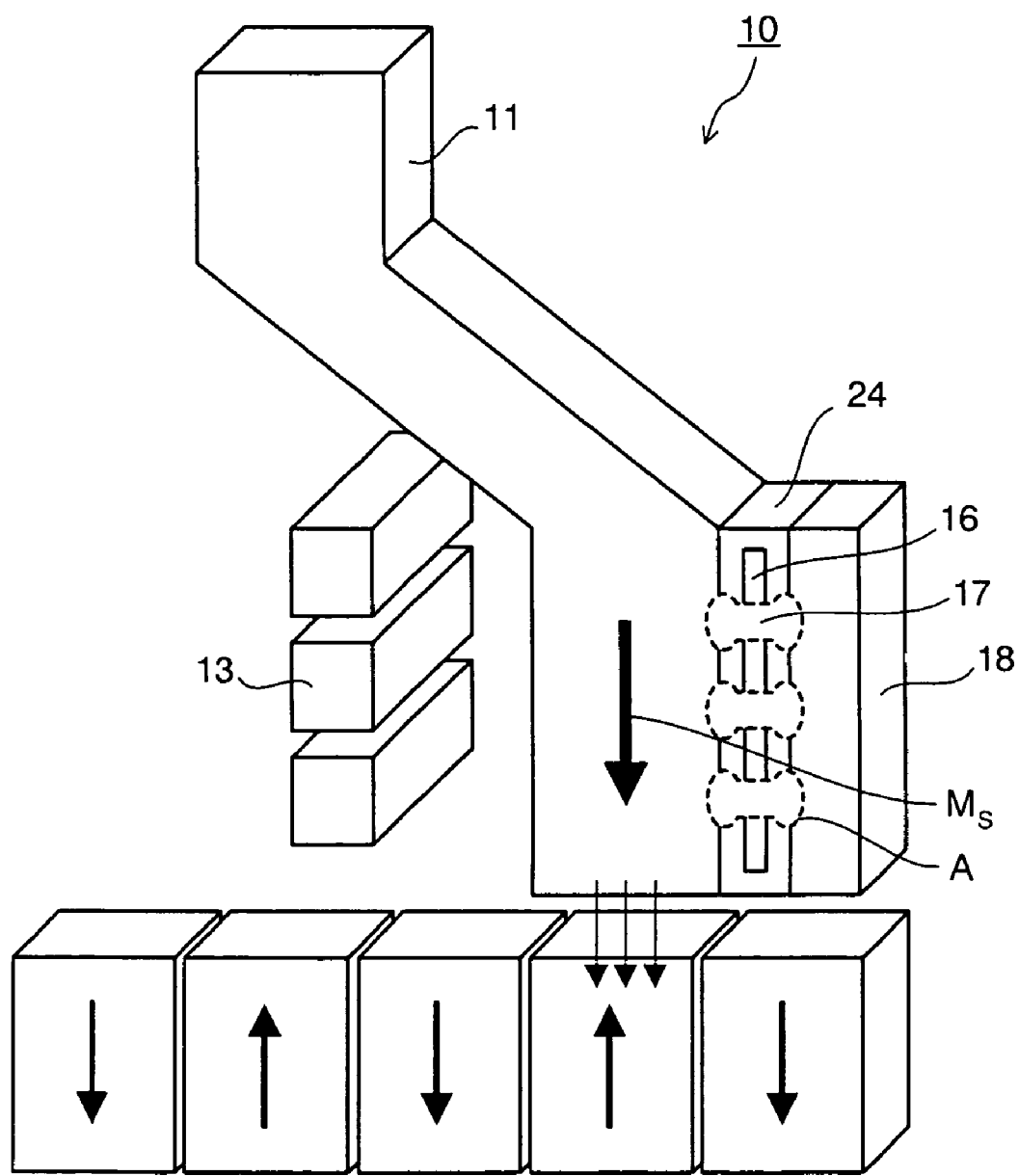
FIG. 16 is a structural view showing a magnetic recording head according to another embodiment.
Figure 17:
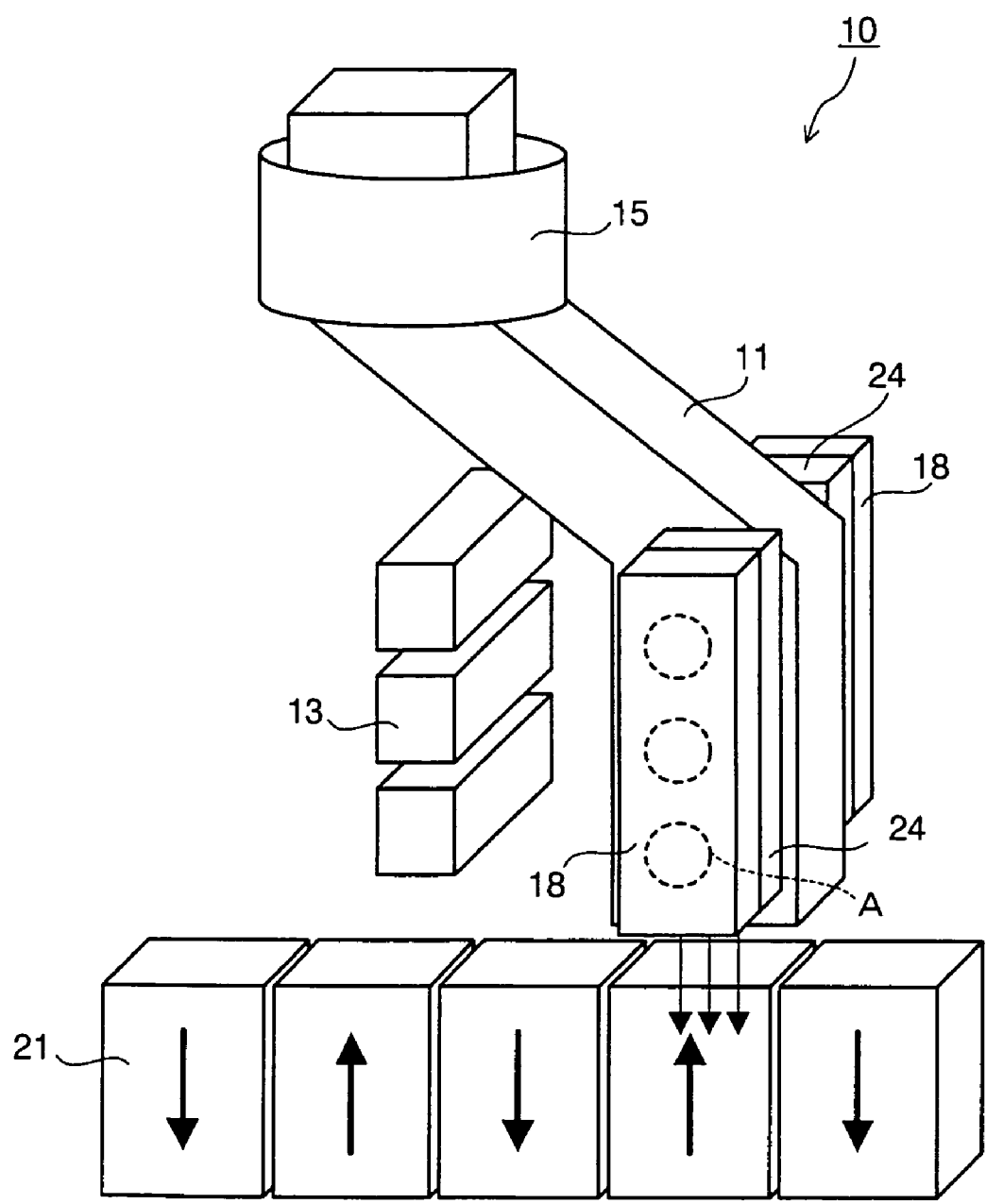
FIG. 17 is a structural view showing a magnetic recording head according to still another embodiment.

In the above-embodiments, although the main magnetic pole-magnetization fixing portions 24 made of antiferromagnetic layers are disposed at both sides of the main magnetic pole 11, one of the main magnetic pole-magnetization fixing portions 24 may be disposed at either side of the main magnetic pole 11. The concrete configuration will be described in FIGS. 12 and 13. The main magnetic pole-magnetization fixing portions 24 made of antiferromagnetic layers may be disposed at the front side and the rear side so as to sandwich the main magnetic pole 11 along the track width direction. The variations in the configuration of the magnetic recording head are schematically illustrated in FIGS. 15, 16 and 17.

In the second embodiment, the oxide layers with the metal paths are embedded in the antiferromagnetic layers. However, the oxide layers may be disposed at the inner sides of the electrodes 18. In this case, the metal layers are formed under the oxide layers, respectively so that the energy applying operation such as ion beam irradiation is conducted to the metal layers and/or the oxide layers to pump up the elements of the metal layers into the oxide layers and thus, form the metal paths. Since the material of the metal paths depends on the material of the metal layers, the sort of material of the metal paths can be changed by changing the material of the metal layers.

What is claimed is:

1. A magnetic recording head, comprising:
   a main magnetic pole containing a ferromagnetic layer;
   a main magnetic pole-magnetization fixing portion containing an antiferromagnetic layer in contact with at least one side surface of said main magnetic pole;
   a heater including a metallic body, being provided apart from said main magnetic pole-magnetization fixing portion and being provided so as to surround said main magnetic pole, for heating at least said main magnetic pole so that a magnetic interaction between said main magnetic pole and said main magnetic pole-magnetization fixing portion can be decreased; and
   a magnetic field generator for generating a magnetic field so as to direct a magnetization of said main magnetic pole in one direction.

2. The magnetic recording head as set forth in claim 1,
   wherein in non-writing, said magnetization of said main magnetic pole is directed parallel to a surface of a recording medium through said magnetic interaction between said main magnetic pole and said main magnetic pole-magnetization fixing portion,
   wherein in writing, said magnetization of said main magnetic pole is directed perpendicular to said surface of said recording medium through said magnetic interaction between said main magnetic pole and said main magnetic pole-magnetization fixing portion.

3. The magnetic recording head as set forth in claim 1,
   wherein said ferromagnetic layer contains a FeCo-based alloy.

4. The magnetic recording head as set forth in claim 1,
   wherein said antiferromagnetic layer contains at least one selected from the group consisting of IrMn, PtMn, FeMn, NiMn, Ni—O, Fe—O and Ni—Fe—O.

5. The magnetic recording head as set forth in claim 1,
   wherein said antiferromagnetic layer contains a FeRh-based alloy.

6. A magnetic recording/reproducing device comprising a magnetic recording head as set forth in claim 1.

7. A magnetic recording method using a magnetic recording head as set forth in claim 1, comprising:
   heating, in writing, said main magnetic pole with said heater so that a magnetic interaction between said main magnetic pole and said main magnetic pole-magnetization fixing portion can be decreased; and
   generating, in said writing, said magnetic field with said magnetic generator so that said magnetization of said main magnetic pole can be directed perpendicular to a surface of a recording medium by said magnetic field.

* * * * *